US012537816B2

(12) United States Patent
Allen et al.

(10) Patent No.: US 12,537,816 B2
(45) Date of Patent: Jan. 27, 2026

(54) METHODS AND SYSTEMS FOR DELIVERING SECURE SERVICES OR CONTENT TO NON-SUBSCRIBER IDENTITY MODULE (SIM)-BASED ENDPOINT CLIENTS

(71) Applicant: T-Mobile Innovations LLC, Overland Park, KS (US)

(72) Inventors: Mark Allen, Renton, WA (US); Deepak Jaiswal, Redmond, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 78 days.

(21) Appl. No.: 18/663,067

(22) Filed: May 14, 2024

(65) Prior Publication Data

US 2025/0358277 A1    Nov. 20, 2025

(51) Int. Cl.
*H04L 9/40* (2022.01)
(52) U.S. Cl.
CPC .................... *H04L 63/083* (2013.01)
(58) Field of Classification Search
CPC ............... H04L 63/08; H04L 63/083
USPC ............................................. 726/4
See application file for complete search history.

(56) References Cited

U.S. PATENT DOCUMENTS

| | | | |
|---|---|---|---|
| 8,819,848 B2* | 8/2014 | Moore | G06F 21/31 726/28 |
| 9,648,006 B2* | 5/2017 | Lawson | H04L 63/0807 |
| 10,555,172 B2* | 2/2020 | Werdell | H04W 68/005 |
| 2012/0331088 A1* | 12/2012 | O'Hare | H04L 67/1097 709/214 |
| 2019/0068609 A1* | 2/2019 | Sutaria | H04L 63/0876 |
| 2023/0007001 A1* | 1/2023 | Modi | H04W 12/08 |

OTHER PUBLICATIONS

A Comparison of Authentication Protocols for Unified Client Applications; Breggeman et al, Oct. 2023 (Year: 2023).*

* cited by examiner

*Primary Examiner* — Jahangir Kabir

(57) ABSTRACT

A method comprising receiving incoming data destined to a line associated with a user, determining a security parameter associated with the incoming data based on at least one of a source of the incoming data or a content of the incoming data, in which the security parameter indicates a security level of the incoming data, storing, in a second data store accessible to the data application, the incoming data in association with the security parameter, receiving a sync request for the incoming data comprising an access token indicating an authentication type associated with a second factor of authentication used to authenticate the client with an authorization server, transmitting the incoming data to the client when the client is permitted to retrieve the incoming data from a data store.

20 Claims, 7 Drawing Sheets

METHODS AND SYSTEMS FOR DELIVERING SECURE SERVICES OR CONTENT TO NON-SUBSCRIBER IDENTITY MODULE (SIM)-BASED ENDPOINT CLIENTS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An Internet Protocol (IP) Media Subsystem (IMS) core network is a network or a framework for delivering multimedia services over IP networks. The IMS core network may be a standardized architecture defined by the 3rd Generation Partnership Project (3GPP) for delivering voice, video, messaging, and other services over IP-based networks, including both mobile and fixed networks. IMS enables the convergence of traditional telecommunications services with IP-based services, allowing for a more flexible and efficient delivery of multimedia services. An IMS core network may provide telecommunications services to users or customers of the telecommunications service providing company operating the IMS core. The telecommunications services provided by the IMS are being opened up to developers via publicly accessible API endpoints.

SUMMARY

In an embodiment, a method implemented in a communication network including an Internet Protocol (IP) Media Subsystem (IMS) core network is disclosed. The method comprises transmitting, by an authorization application at an authorization server, to a client operated by a user, an access token comprising an authentication type identifying a second factor of authentication used to authenticate the client with the authorization server. The client is a non-subscriber identity module-based device. The method further comprises receiving, by a core application at a core access network element in the IMS core network, a subscription request from the client, in which the subscription request comprises a request to be notified of pending incoming data stored at a first data store and destined to a line associated with the user, and the subscription request comprises the access token. The method further comprises storing, in a second data store accessible to the core application, the authentication type of the second factor of authentication used to authenticate the client with the authorization server, in association with a client identifier identifying the client, receiving, by a data application at a data server, incoming data destined for the line associated with the user, and storing, in the first data store in the data server, the incoming data in association with a security parameter based on at least one of a source of the incoming data or a content of the incoming data, in which the security parameter indicates a security level of the incoming data. The method further comprises determining, by the data application, whether the client is permitted to retrieve the incoming data from the first data store based on the authentication type in the access token and the security parameter associated with the incoming data, and transmitting, by the data application in response to receiving a sync request from the client, the incoming data to the client when the client is permitted to retrieve the incoming data from the first data store.

In another embodiment, a method implemented in a communication network including an Internet Protocol (IP) Media Subsystem (IMS) core network is disclosed. The method comprises receiving, by a data application a data server, incoming data destined to a line associated with a user, determining, by the data application, a security parameter associated with the incoming data based on at least one of a source of the incoming data or a content of the incoming data, in which the security parameter indicates a security level of the incoming data, storing, in a first data store accessible to the data application, the incoming data in association with the security parameter, and receiving, by the data application, from a client, a sync request for the incoming data, in which the sync request comprises an access token indicating an authentication type associated with a second factor of authentication used to authenticate the client with an authorization server, and the client is a non-subscriber identity module-based device. The method further comprises determining, by the data application, whether the client is permitted to retrieve the incoming data based on the authentication type in the access token received from the client and the security parameter associated with the incoming data, transmitting, by the data application, the incoming data to the client when the client is permitted to retrieve the incoming data from a data store, and transmitting, by the data application, a security message to the client when the client is prohibited from retrieving the incoming data from the data store, wherein the security message indicates that the client has not met a minimum authentication requirement with the authorization server to retrieve secure data from the data store.

In yet another embodiment, a data server is disclosed. The data server comprises a non-transitory memory, a processor coupled to the non-transitory memory, and a data application stored at the non-transitory memory. The data application, when executed by the processor, causes the processor to be configured to receive incoming data destined to a line associated with a user, determine a security parameter associated with the incoming data based on at least one of a source of the incoming data or a content of the incoming data, in which the security parameter indicates a security level of the incoming data, store, in a first data store accessible to the data application, the incoming data in association with the security parameter, receive from a client, a sync request for the incoming data, in which the sync request comprises an access token indicating an authentication type associated with a second factor of authentication used to authenticate the client with an authorization server, and the client is a non-subscriber identity module-based device, determine whether the client is permitted to retrieve the incoming data based on the authentication type in the access token received from the client and the security parameter associated with the incoming data, transmit the incoming data to the client when the client is permitted to retrieve the incoming data from the first data store, and transmit a security message to the client when the client is prohibited from retrieving the incoming data from the data store, wherein the security message indicates that the client has not met a minimum authentication requirement with the authorization server to retrieve secure data from the data store.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
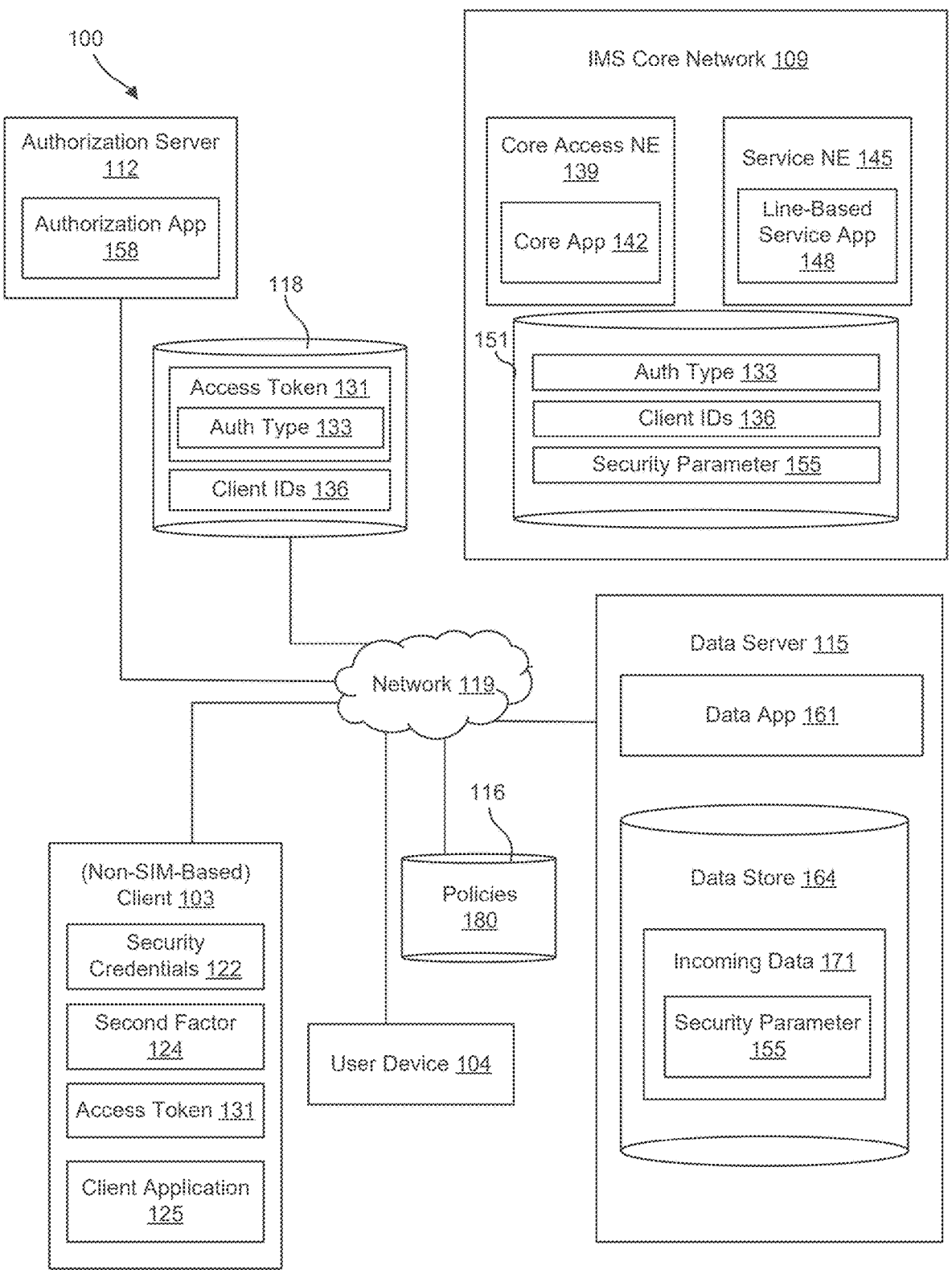
FIG. 1 is a block diagram of a communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

As mentioned above, the IMS core network may deliver services to clients over IP networks. The services provided by the IMS core network may include, for example, voice services (e.g., voice calls), video services (e.g., video calls and video conferencing), messaging services (e.g., text messaging (SMS) and multimedia messaging (MMS), presence and availability sharing (e.g., sharing of user presence and availability data), etc. A client may use the services provided by the IMS core network when the user operating the client is a registered customer of the telecommunications service provider (TSP) company operating the IMS core network. For example, the client may be a device programmed with one or more application programming interfaces (APIs) that may securely communicate with various other API endpoints in a communication network (e.g., an authorization server, a core access network element (NE) in the IMS core network, various data stores etc.).

In some cases, the client may be a device registered at the TSP with the user under a subscription plan tied to a user account of the user. In other words, the client may be a subscriber identity module (SIM)-based client device tied to a particular line under a subscription plan of the user. A line may be a telecommunications access line (e.g., a subscriber line, private line, channel, or circuit). The line may be associated with a phone number or a Mobile Station International Subscriber Directory Number (MSISDN) that is registered with the user account. For example, the user account may be associated with multiple lines or telephone lines, in which each line is associated with a different MSISDN. A line may also be referred to herein as a telephone line or a service line. The user of the client may first log in to a website or application associated with the TSP using security credentials (e.g., username and password) registered with the user. The client may then access and use services provided by the IMS core directly from the SIM-based client.

In other cases, the client may be a device that is not registered at the TSP with the user, or any user, under a subscription plan. Such a device may be a non-SIM-based device that is not tied to a particular phone number or MSISDN registered at the TSP. Instead, the client may simply be a computing device running a web browser that may access different websites or applications. In this case, the user may operate the client to open a website or application associated with the TSP, and then authenticate the client (or user) with the TSP by providing authentication information via the website or application. In one case, the authentication process may simply involve the user providing security credentials associated with the user account into the website or application associated with the TSP, thereby logging the user into the user account.

In other cases, the authentication process may involve a two-factor authentication process, which adds an extra layer of security to the username/password security credential login process, by requiring users to provide a second factor of authentication (e.g., a second form of verification) to authenticate an identity of the user operating the client. The second factor of authentication may be, for example, a temporary code (e.g., received via a separate device, the same client, or via email/messaging), biometric data (e.g., fingerprints), physical devices (e.g., hardware tokens), authentication applications, smart cards, push notifications, location-based data, etc.

The user may authenticate the identity of the user operating at the non-SIM based client using either the one-factor authentication process alone (e.g., using the security credentials only) or using the two or multi-factor authentication process. An authorization server may verify the identity of the user and then return an access token back to the client, which may be used by the client to receive access to services at the IMS core network. The IMS core network may provide the services to the client via the application or website through which the user logged in and provided the authentication information. For example, one of the services may enable users of non-SIM based clients to receive and make phone calls, receive and send messages, etc. using a registered line of the user. After the user is authenticated, the user may select a line via a user interface of the non-SIM based client device, and then perform various actions using the line (e.g., make a call, send a text message) using a browser or application at the client. Similarly, the user may receive calls and messages using the same line via the browser or application at the non-SIM based client device.

However, this particular service may be misused in various ways, resulting in different instances of user fraud. For example, hackers may be able to social engineer the security credentials, which may then be used to fraudulently login to the user account at a non-SIM-based client, and then receive secure services and/or content intended for the registered phone number (i.e., the user, not the hacker). The secure services and/or content (e.g., messages, calls, files, videos, multimedia files, other types of content) may include security-related information received from other applications, which may then be used to access other sensitive user accounts (e.g., user bank accounts, etc.).

In this way, the IMS core service that enables users to use a registered line through a non-SIM-based client is technically problematic for various reasons, the primary reason being the lack of security offered by the service. The security breaches that may result as a consequence of enabling users to use a registered line at a non-SIM-based client may cause several other types of issues, for example, IMS core network breaches, network congestion (e.g., for resolving the hack), dropped messages and services for the user, etc.

The present disclosure addresses the foregoing technical problems by providing a technical solution in the technical field of token-based authentication of a non-SIM-based client with an IMS core network. The embodiments disclosed herein are directed to methods and systems of preventing secure services and/or content from being sent to client applications, at various types of client devices, unless certain conditions have been met. The embodiments disclosed herein may be implemented by a communication network including, for example, one or more clients (in which at least one client is a non-SIM-based client), an authorization server, a data server, and an IMS core network, the functions of which are further described herein.

As described above, the user may first authenticate with the authorization server using a particular type of authentication (e.g., one-factor authentication, a two-factor authentication, etc.). Each type of authentication may be associated with a different authentication level (e.g., low, high, medium), each level being associated with a likelihood that the authentication accurately verified an identity of the user. For example, stronger authentication schemes such as the two-factor authentication schemes have a higher authentication level than weaker authentication schemes such as the one-factor authentication schemes. Similarly, the user logs into the online platform using both security credentials and a one-time password received at a separate user device (e.g., two factor authentication method), this may be considered a high authentication level.

Regardless of the type of user authentication, the user may still provide authentication data (e.g., security credentials and/or a second factor of authentication) via a user interface of the non-SIM-based client, which the client forwards to an authorization server. An authorization application at the authorization server may validate the authentication data to verify an identity of the client (e.g., verify that the user operating the client is truly the user associated with the logged-in user account) using different authentication methods and algorithms. Once authenticated, the authorization application may return an access token to the client, which may be used by the client to receive access to services from the IMS core. For example, the access token may be embodied as a string of characters, and in some cases, may be a JAVA archive (JAR) token with various attributes.

In an embodiment, the authorization application may add an authentication type as an attribute to the access token generated for the client. The authentication type may be, for example, a value or identifier identifying the type of authentication performed by the client with the authorization server. For example, the authentication type may be a value identifying a one-factor authentication method used by the client to authenticate with the authorization server. The authentication type may also be a value identifying a specific second factor of authentication used by the client when the client authenticated with the authorization server using a two-factor authentication method. For example, the authentication type may be a first value when the second factor of authentication is a one-time code received via a message at a separate device, and may be a second value when the second factor of authentication is a security question and answer combination.

After authentication, the authorization application may then transmit an instruction to a data application at a data server to begin storing data destined for a line (e.g., phone number, MSISDN) associated with the user, which may have been requested at log in. The data may be associated with secure services and/or content received from or destined for the client. The secure services and/or content may include, for example, messages, video messages, voicemails, calls, multimedia files, and/or any other type of data that may include sensitive information. In this case, the line may always be associated with a SIM-based device of the user and may temporarily be replicated at the non-SIM-based client that has been authenticated with the authorization server. The data application may then be programmed to obtain and store data that is also being sent to the line at the SIM-based device of the user.

For example, the core network may send secure services and/or content to the SIM-based device of the user as normal. However, in some cases, the user may inadvertently have forgotten the user's personal mobile phone (i.e., SIM-based device) at home, and then travelled to a work location without the user's mobile phone. In such a case, the user may then login to the user account an office computer (i.e., non-SIM-based device) to authenticate with the authorization server using one or two factors of authentication (e.g., security credentials, one-time codes, etc.), as described above. Then at this stage, after the non-SIM-based device is be authenticated with the authorization server, and the data application at the data server may be instructed to store data that is destined for the line at user's mobile phone (SIM-based device) based on the incoming secure services and/or content.

When the data application receives the incoming secure services and/or content destined for the line, the data application may analyze the incoming secure services and/or content to determine whether the incoming secure services and/or content is to be labeled as including secure data. This determination may be performed based on content type included in the incoming secure services and/or content, SIP or HTTP headers/tags, originating identities, etc. The data application may then add parameters (e.g., in the form of tags or metadata) to the incoming secure services and/or content before storing the data from the incoming secure services and/or content in a data store at the data server. The parameters may describe various attributes of the incoming secure services and/or content. One such parameter may be a security parameter, which may indicate a security level of the incoming secure services and/or content. A security parameter (e.g., security level) may indicate whether the incoming secure services and/or content include secure data or not. For example, the security level of the incoming services/content may be high when the incoming services/content includes one-time codes for other services (e.g., secure data), and the security level of incoming services/content may be low when the incoming services/content does not include one-time codes for other services. The data application may determine a security parameter for the incoming secure services and/or content based on various factors, such as, for example, a source of the incoming secure services and/or content, a path of the incoming secure services and/or content to the data server, content in the incoming secure services and/or content, etc. For example, the data application may determine that the security parameter for the incoming secure services and/or content is high when the incoming secure services and/or content originates from an application (e.g., source), such that, for example, a message is an application-to-peer (A2P) type of message. As another example, the data application may determine that the security parameter for a call is high when the call flows through a path including a service delivery gateway, or that the security parameter for a call is low when the call flows through a path including an SMS gateway. As yet another example, the data application may determine that the security parameter for a message is high when the content of the message includes a one-time code, or the data application may determine that the security parameter for a voicemail is low when the content of the message includes casual text (e.g., may be determined using natural language processing (NLP) methods, speech-to-text algorithms, voice biometrics, etc.).

In the aforementioned examples, the security parameters correspond to high and/or low levels, and in this way, the security parameter may be a certain value corresponding to high and/or low (e.g., high may be the value 1 while low may be the value 0, or vice versa). In other cases, the security parameters may be values within a certain range (e.g., 1-5, in which 1 is a value corresponding to incoming services/content that do not contain any secure, private information, and 5 is a value corresponding to incoming services/content that contain more than a threshold amount of secure, private information). In this way, the security parameter may be a value describing a level of sensitivity or privacy of information carried in the incoming secure services and/or content. The data application may store the data from the incoming secure services and/or content in the data store of the data server with the security parameter determined for the incoming secure services and/or content.

After authenticating with the authorization server, the client may also transmit a subscription request to a core access NE of the IMS core network. The subscription request may include the access token received from the authorization server, and again, the access token contains an attribute indicating an authentication type of the client. A core application at the core access NE may extract the authentication type from the access token to determine the level of authentication that the client performed with the authorization server.

The core access NE may have access to policies, indicating that certain authentication types may have certain corresponding privileges. For example, a policy may indicate that a client may (be permitted to) receive incoming services/content with a high security parameter (e.g., messages with highly sensitive or secure data) when the access token from the client indicates an authentication type identifying a strong second factor of authentication (e.g., a strong second factor of authentication may be a one-time code received by an SMS message from a separate device). In contrast, another policy may indicate that a client may only (be permitted to) receive calls with a low security parameter (e.g., calls without highly sensitive or secure data) when the access token from the client indicates an authentication type identifying only a first factor of authentication low or weak second factor of authentication (e.g., a weak second factor of authentication may be security questions and answers).

The core application may use the policies and the access token received from the client in the subscription request to determine a subscription for the client. When the core application determines that the client is permitted to receive the incoming secure services and/or content with a high security parameter (e.g., secure the incoming secure services and/or content) based on the access token received from the client and one or more policies, the core application may create a subscription for the client indicating that the client is permitted to receive such the incoming secure services and/or content with a high security parameter. The subscription may be created in a data store of the IMS core network. The subscription may include subscription data, such as a client identifier of the client, the authentication type, and the security parameter of the types of incoming services and/or content permitted to (or prohibited from) being sent and received by the client.

The core application may send the subscription data to the data server. In some cases, the data server may store a similar subscription in association with the client in a data store of the data server. The data application may send notifications to the client of pending incoming secure services and/or content at the data server destined for the line based on the subscription.

For example, when the client is subscribed to receive messages with a low security parameter, the data application may transmit a notification to the client indicating only the pending services and/or content with a low security parameter. In this case, the data application may intentionally exclude any data from incoming services and/or content with a high security parameter that are stored at the data store and destined for the line from the notification, since the client may not be permitted to receive these types of incoming services and/or content. In an embodiment, the notification may only indicate that incoming services and/or content are pending for the client in association with the line, and the client is responsible for sending a sync request for fetching the data related to incoming services and/or content from the data server.

In an embodiment, the notification may also indicate that secure incoming services and/or content are not permitted to be sent to the client because the client has not authenticated with the authorization in the manner required to receive secure data. This indication may also include data as to the types of authentications that the client may perform with the authorization server to be permitted to retrieve the secure data from the data server. In an embodiment, this indication may be sent to the client as a separate security message, separate from the notification.

When the client is subscribed to receive services and/or content with a high security parameter, the data application may transmit a notification to the client of the all the pending data at the data server (e.g., standard data and secure data (e.g., data from the incoming secure services and/or content). In an embodiment, the notification may only indicate that incoming services and/or content are pending for the client in association with the line, and the client is responsible for sending a sync message for fetching the data associated with the incoming services and/or content from the data server.

Regardless of whether the client receives a notification, the client may transmit a sync request to the core application to fetch the secure data (e.g., data from the incoming secure services and/or content) destined for the line from the data server. The sync request may include the access token assigned to the client. The core application may first validate the access token with the authorization server. Once validated, the core application may forward the sync request to the data server, for the data server to forward stored secure data to the client based on the authentication type indicated in the access token received from the client.

The data application may obtain the access token of the client and determine, based on the authentication type in the access token and one or more policies, whether the client is permitted to receive all types of data including secure data associated with a high security parameter, or the client is only permitted to receive standard data (excluding all of the data with a high security parameter)—in a manner similar to that described above. The data application may then forward only the permitted types of data to the client. For example, when the data application determines that the client is permitted to receive incoming services/content with a high security parameter (e.g., secure messages) based on the access token received from the client and one or more policies, the data application may transmit all the pending incoming services/content (e.g., or specific requested messages) at the data server (e.g., standard messages and secure messages) to the client. In contrast, when the data application determines that the client is permitted to only receive incoming services/content with a low security parameter (e.g., standard messages, not including the secure messages with a high security parameter), the data application may transmit only the pending incoming services/content (e.g., or the requested messages) that do not have the high security parameter to the client.

In this way, users may use non-SIM-based clients with a line associated with another device in a safe manner, such that if a user's security credentials are hacked, the system prevents the hacker from having access to secure information that may have otherwise been sent to the line. In particular, by enhancing the access token to indicate an authentication type of the client, the system ensures that only thoroughly verified clients (e.g., clients that authenticated with the authorization server with at least two factors of authentication, with the second factor being a strong factor of authentication) are permitted to receive secure data from the data server. Therefore, the embodiments disclosed herein greatly increase the security of services offered by the IMS core network that enable non-SIM-based devices to operate a line associated with a user. By increasing the security of these services, security breaches into the IMS core network or other secure networks may be significantly decreased, thereby increasing processing and network capacity.

Turning now to FIG. 1, a communication network 100 is described. The communication network 100 includes a client 103, a user device 104, an IMS core network 109, an authorization server 112, a data server 115, data store 116, data store 118, and network 119. Network 119 may be one or more private networks, one or more public networks, or a combination thereof, interconnecting the client 103, user device 104, IMS core network 109, authorization server 112, data server 115, and data stores 116, 118. While FIG. 1 illustrates the IMS core network 109, authorization server 112, data server 115, and data stores 116, 118 as being separate from the network 119, it should be appreciated that in some embodiments, the IMS core network 109, authorization server 112, data server 115, and data stores 116, 118 may be part of the network 119. While FIG. 1 illustrates the authorization server 112, data server 115, and the data stores 116, 118 as being separate from the IMS core network 109, it should be appreciated that in some embodiments, the authorization server 112, data server 115, and the data stores 116, 118 may be part of the IMS core network 109. While FIG. 1 illustrates data stores 116 and 118 as separate data stores, in an embodiment, the data stores 116 and 118 may be co-located together in a single storage system or data center, or located separate from one another across different geographic locations/data centers.

The first client 103 and the user device 104 may be connected to the network 119 using a wired or wireless communication link (e.g., using a local area network or a base station, and communicating to the network 119 via a cellular or WiFi connection). For example, the client 103 and the user device 104 may communicate with the network according to a 5G, a long term evolution (LTE), a code division multiple access (CDMA), or a global system for mobile communications (GSM) wireless telecommunication protocol.

The client 103 and the user device 104 may both be devices, such as, for example, user equipment (UE), cell phone, a mobile phone, a smart phone, a personal digital assistant (PDA), an Internet of things (IoT) device, a wearable computer, a headset computer, a laptop computer, a tablet computer, or a notebook computer. The client 103 and the user device 104 may both be devices operated by a user. However, the client 103 and the user device 104 may be different, in that the user device 104 may be a registered device of the user with a TSP. The user device 104 may include a SIM card or an electronic SIM (eSIM) profile tied to line, which may be associated with one or more subscription plans linked to a user account of the user in the IMS core network 109.

Meanwhile, the client 103 may be a non-SIM-based device that does not include a SIM card or an eSIM profile, and is not tied to a line associated with the user account of the user. However, as mentioned above, the client 103 may still include web browsers, applications, and APIs that enable a user to authenticate the client 103 with the authorization server 112. To this end, the client 103 may run a client application 125, which may be instructions stored on a memory of the client 103, which when executed by a processor of the client 103, may be configured to perform various steps as disclosed herein. For example, the client application 125 may present a user interface on a display of the client 103, and the user may input authentication data, such as security credentials 122 (e.g., username and password), a second factor 124 of authentication (e.g., a time-based code), etc., into the website or application associated with the TSP via the user interface.

The second factor 124 of authentication may be embodied as various of types of authentication data, which may be received through different devices, applications, etc., and which may be further used to confirm the identity of the user operating the client 103. The second factor 124 of authentication may be, for example, a temporary code (e.g., received via a separate device, the same client, or via email/messaging), biometric data (e.g., fingerprints), physical devices (e.g., hardware tokens), authentication applications, smart cards, push notifications, location-based data, etc. After the authorization server 112 authenticates the client 103 based on the authentication data, the client 103 may receive an access token 131 from the authorization server 112. The client 103 may store the access token 131 locally.

The authorization server 112 may be a computer system, server software/hardware, or a collection of processors, memories, and/or networking resources used to perform token-based authorization and authentication methods with the first client 103. For example, the authorization server 112 may be implemented as an OAuth server. The authorization server 112 may include an authorization application 158, which may include instructions stored on a memory of the authorization server 112 that when executed by a processor of the authorization server 112, causes the authorization application 158 to perform various steps as disclosed herein in FIGS. 2A-C.

The authorization application 158 may implement various different types of token-based authorization and authentication methods to facilitate secure and authorized access to the IMS core network 109 by non-SIM-based clients 103. For example, the authorization application 158 may receive the authentication data (e.g., the security credentials 122 and/or the second factors 124 of authentication) from the client 103 using different authentication methods and algorithms. The authorization application 158 may first verify the identity of the user and then return an access token 131 to the client 103. The access token 131 may include information that is used to identify and authorize the client 103 to access specific resources at the IMS core network 109 on behalf of the user. The access token 131 may represent an authorization granted to the client 103 for accessing resources in the IMS core network 109. For example, the access token 131 may be embodied as a string of characters, and in some cases, may be a JAVA archive (JAR) token. For example, the access token 131 may include various fields or attributes, such as a token type (e.g., "bearer"), access rights (e.g., permissions or access rights granted to the client), expiration time, issued time, issuer, etc.

In an embodiment, the authorization application 158 may add attributes to the access token 131 based on the type of authentication performed by the client. The authorization application 158 may add an authentication type 133 as an attribute to the access token 131 generated for the client 103. The authentication type 133 may be, for example, a value or identifier identifying the type of authentication performed by the client with the authorization server. For example, the authentication type 133 may be a value indicating that multiple factors of authentication were used by the client to authenticate with the authorization server 112. For example, the authentication type 133 may be a value identifying a one-factor authentication method used by the client to authenticate with the authorization server 112. The authentication type 133 may also be a value identifying a second factor 124 of authentication used by the client 103 when the client 103 authenticated with the authorization server 112 using a two-factor authentication method. The authorization application 158 may also store the access token 131 generated for a client 103 in association with a client identifier 136 identifying the client 103 or the user in the data store 118. In this way, data store 118 may include the valid access tokens 131 (e.g., including expiration dates) and the respective client identifier 136 for all authorized clients 103.

The IMS core network 109 may be a sub-network including multiple nodes and functions that provide a framework for delivering multimedia services over IP networks. The IMS core network 109 may converge telecommunications services with IP-based services, allowing for a more flexible and efficient delivery of multimedia services. The IMS core network 109 may consist of various NEs communicatively coupled together and that work together to enable the delivery of services to the first client 103 when registered. For example, the NEs may include a Call Session Control Function (CSCF), a Home Subscriber Server (HSS), a Media Resource Function (MRF), a Breakout Gateway Control Function (BGCF), and Policy and Charging Rules Function (PCRF), etc.

As shown in FIG. 1, the IMS core network 109 includes a core access NE 139, which may be positioned at an edge of the IMS core network 109. The core access NE 139 may be located at a periphery or outer boundary of the IMS core network 109, such that the core access NE 139 interfaces with the different clients 103, data stores 116, 118, and servers 112, 115 in the communication network 100. The core access NE 139 may include a core application 142, which may be instructions stored on a memory of the core access NE 139 that when executed, cause the core application 142 to perform various steps as disclosed herein with reference to FIGS. 2A-C.

The IMS core network 109 may also include a data store 151, storing data describing subscribed clients (and users). For example, the core application 142 may create subscriptions for the client 103 with the IMS core network 109 (e.g., with respect to a particular line-based service that provides access to a line at the non-SIM-based client 103). The subscription may be created by adding data describing the client 103 to the data store 151. As further described herein, the client 103 may have authenticated with the authorization server 112 using a particular method of authentication (e.g., only first factor of authentication, specific second factors 124 of authentication, etc.), which as described above may be identified by the authentication type 133. To this end, the data describing the first client 103 added to the data store 151 may include, for example, a client identifier 136 identifying the client 103, the authentication type 133, and a security parameter 155.

As further described herein, the security parameter 155 may be a value indicating a security level of the incoming data 171. The incoming data 171 may refer to the incoming services and/or content intended for the client 103, which may include, for example, data associated with messages, video messages, voicemails, calls, multimedia files, and/or any other type of data that may include sensitive information. For example, the security parameter 155 may indicate a first value when the incoming data 171 includes secure, private, and/or sensitive information, and the security parameter 155 may indicate a second value when the incoming data 171 does not include secure, private, and/or sensitive information. The security parameter 155 may also be a value within a range measuring the private nature or sensitivity of the information contained in the incoming data 171 (e.g., a value of 0 being the least sensitive information, and a value of 10 being highly secure information). In this way, the security parameter 155 stored with the client identifier 136 in the data store 151 may identify incoming data 171 at the data server 115 that is permitted to be retrieved by the client 103.

The subscription may be based on one or more policies 180, governing the creation of subscriptions at the IMS core network 109 and data server 115, and governing the permissions of different clients 103 to receive different types of incoming data 171. The policies 180 may be stored in the data store 116. While data store 116 is shown as being external to and separate from the IMS core network 109 in FIG. 1, it should be appreciated that in other embodiments, the data store 116 may be part of the IMS core network 109. The policies 180 may indicate associations between authentication types 133 in different access tokens 131 and corresponding privileges or permissions of the clients 103 associated with the access tokens 131.

For example, a policy 180 may indicate that a client 103 may (be permitted to) receive incoming data 171 (that is destined for the line) with a high security parameter 155 (e.g., indicating a secure incoming service/content/message/file containing secure data) when the access token 131 from the client 103 indicates an authentication type identifying a high-level (strong) second factor 124 of authentication (e.g., a one-time code received by an SMS message from a separate device, authentication performed using an authentication application). In contrast, another policy 180 may indicate that a client 103 may only (be permitted to) receive incoming data 171 (that are destined for the line) with a low security parameter 155 (e.g., indicating a standard incoming service/content/message/file that does not contain secure data) when the access token 131 from the client 103 indicates an authentication type 133 identifying only a first factor of authentication low or medium-level (weak) second factor 124 of authentication (e.g., security questions and answers).

The data server 115 may be a computer system, server software/hardware, or a collection of processors, memories, and/or networking resources used to perform various steps and functions, as disclosed herein. The data server 115 may include a data application 161, which may include instructions stored on a memory of the data server 115 that when executed by a processor of the data server 115, causes the data application 161 to perform various steps as disclosed herein in FIGS. 2A-C. The data application 161 may receive incoming data 171 destined for the line associated with the client 103, analyze the incoming data 171 to tag the incoming data 171 with a security parameter 155, send notifications to the client 103 based on a subscription of the client 103, and transmit incoming data 171 from the data server 115 to the client 103 as permitted. The incoming data 171 and associated security parameters 155 may be stored in a data store 164, as shown in FIG. 1. The data store 164 may be a collection of one or more memories, that may store incoming data 171 for various clients 103 (both SIM-based and non-SIM-based) in, for example, different storage buckets or containers dedicated for different lines or users.

Figure 2A:
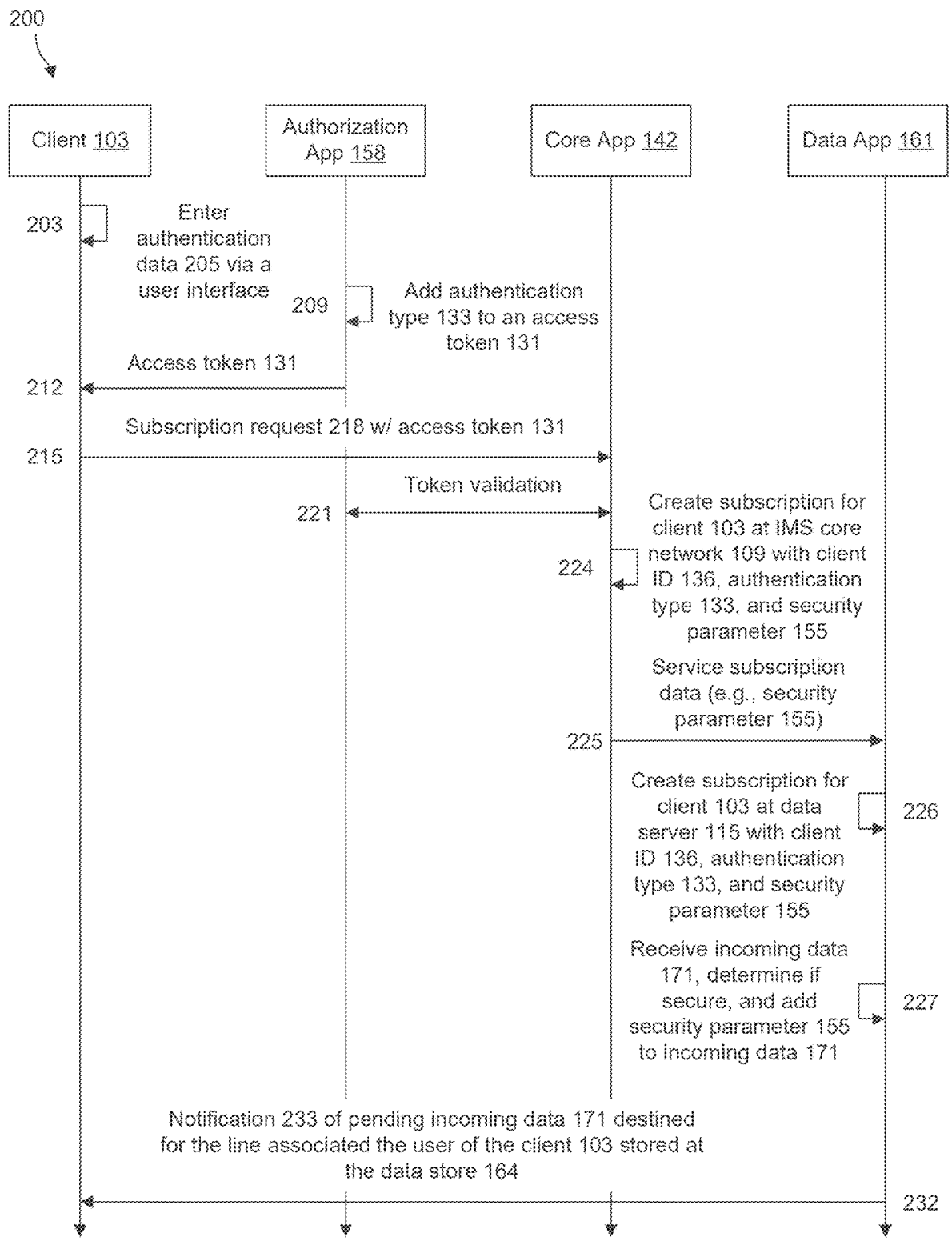
FIGS. 2A-C are message sequence diagrams illustrating communications between various components of the communication network of FIG. 1 to securely deliver incoming data to non-SIM-based endpoint devices according to various embodiments of the disclosure.
Figure 2B:
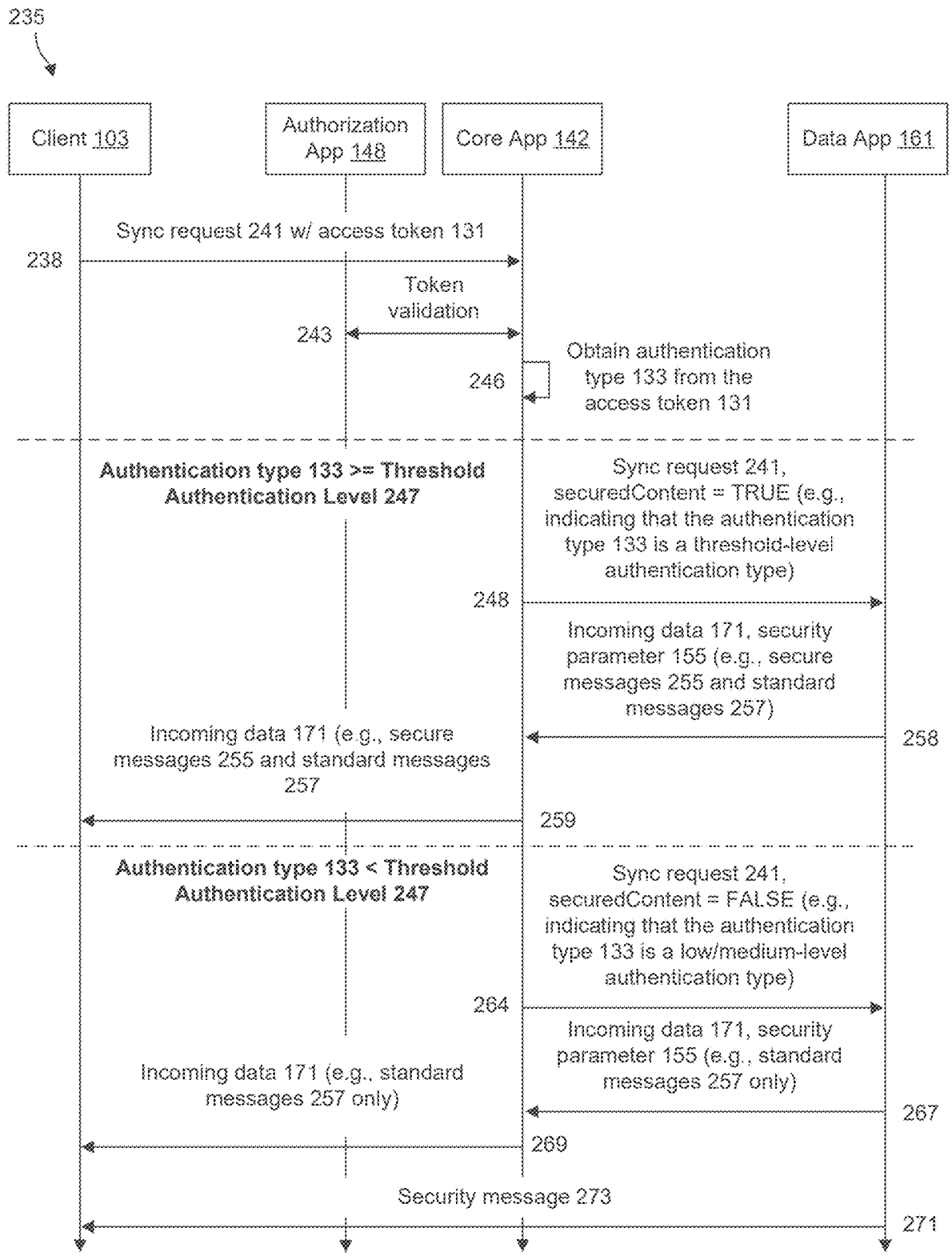
Figure 2C:
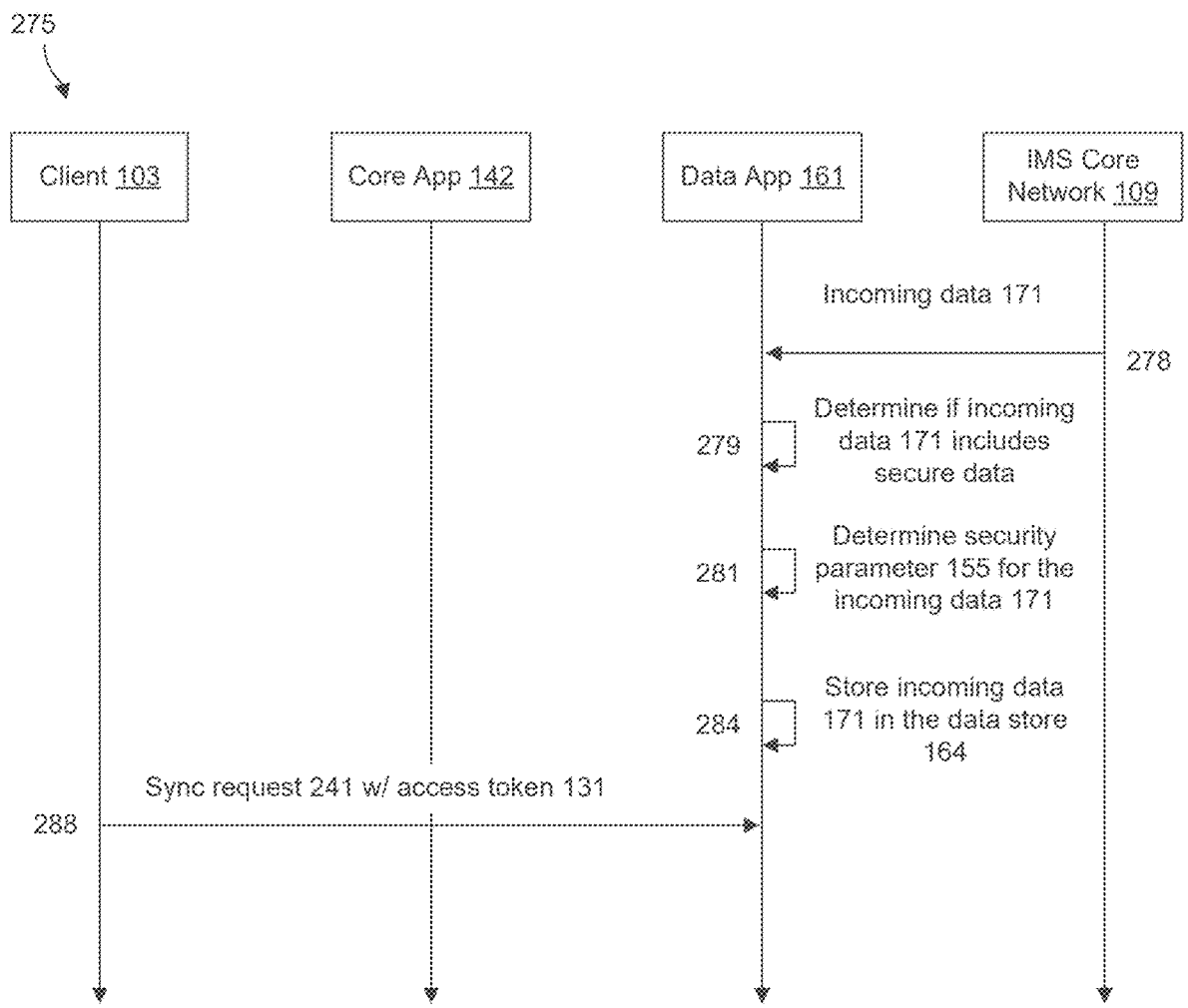

Referring now to FIGS. 2A, 2B, and 2C, shown are message sequence diagrams 200, 235, and 275, respectively. Each of the message sequence diagrams 200, 235, and 275 show communications between the client 103, the authorization server 112, the core access NE 139, the data server 115, and/or the IMS core network 109.

Turning now to FIG. 2A, shown is a message sequence diagram 200 illustrating a first method for securely delivering incoming data 171 to non-SIM-based clients 103. Specifically, the message sequence diagram 200 of FIG. 2A illustrates the initial authentication and subscription process for securely delivering incoming data 171 to non-SIM based clients 103.

At step 203, a user of the client 103 may enter authentication data 205 (e.g., security credentials 122 and/or a second factor 124 of authentication) into a website or application associated with the IMS core network 109 via a user interface of the client 103 to, for example, access a page associated with a user account of the user. The page may indicate one or more lines that are assigned to the user, for example, in which each line is associated with a different phone number or MSISDN. Each line may also thus be associated with one or more subscription plans. The user may select a line on the page via the user interface, to request use of the line from the (non-SIM-based) client 103. In other words, the user may select the line that the user wishes to use to essentially receive and send phone calls/messages/data via the client 103.

The authentication data 205 and, in some cases, the line requested by the user may be sent to the authorization server 112. The authorization application 158 at the authorization server 112 may authenticate the client 103 and validate the identity of the user using authentication and authorization methods and techniques not described herein. At step 209, after the authorization application 158 authenticates the user/client 103, the authorization application 158 may generate an access token 131 for the client 103 and add an authentication type 133 to the access token 131. The authentication type 133 may identify, for example, the authentication data 205 provided by the client 103 to authenticate with the authorization server 112. For example, the authentication type 133 may include a first value if the user only provided security credentials 122, a second value if the user provided security credentials 122 and a one-time code received via the user device 104, a third value if the user provided security credentials 122 and a one-time code received via email, a fourth value if the user provided security credentials 122 and an authorization application provided a second factor 124 of authentication, a fifth value if the user provided security credentials 122 and a biometric feature, a sixth value if the user provided security credentials 122 and a hardware token, etc. At step 212, the authorization application 158 may transmit the access token 131 to the client 103.

At step 215, after the client 103 has authenticated with the authorization server 112, the client 103 may transmit a subscription request 218 to the core application 142 at the core access NE 139. The subscription request 218 may include the access token 131 received from the authorization application 158.

At step 221, the core application 142 may first validate the access token 131 by, for example, verifying that the access token 131 is still valid (e.g., the expiration date has not passed). The core application 142 may also validate the access token 131 by communicating with the authorization application 158 to verify that the access token 131 received from the client 103 is the same as the valid access token 131 assigned to the client 103 by the authorization application 158. The core application 142 may then extract the authentication type 133 from the access token 131 to determine the level of authentication that the client 103 performed with the authorization application 158.

At step 224, the core application 142 may use the policies 180 and the access token 131 received from the client 103 in the subscription request 218 to create a subscription for the client 103. For example, when the core application 142 determines that the client 103 is permitted to receive incoming data 171 (e.g., incoming services or content) with a first security parameter 155 (e.g., a high security parameter 155 indicating secure incoming data 171 including secure, sensitive information) based on the access token 131 received from the client 103 and one or more policies 180, the core application 141 may create a subscription for the client 103 indicating that the client 103 is permitted to receive notifications 233 describing incoming data 171 with the first security parameter 155, and consequently, the incoming data 171 with the first security parameter 155. Similarly, when the core application 142 determines that the client 103 is prohibited from receiving incoming data 171 with the first security parameter 155 (e.g., a high security parameter 155) based on the access token 131 received from the client 103 and one or more policies 180, the core application 141 may create a subscription for the client 103 indicating that the client 103 is prohibited from receiving notifications 233 describing incoming data 171 with the first security parameter 155, and consequently, the incoming data 171 with the first security parameter 155. The subscription may be created in a data store 151 of the IMS core network 109. The subscription may include a client identifier 136 of the client 103, the authentication type 133, and the security parameter 155 of the types of incoming data 171 permitted (or prohibited) from being sent and received by the client 103.

At step 225, the core application 142 may send the subscription data (e.g., the client identifier 136 of the client 103, the authentication type 133, and the security parameter 155 of the types of incoming data 171 permitted or prohibited) to the data server 115. At step 226, the data application 161 may create a similar subscription for the client 103 with the subscription data.

At step 227, the data application 161 may receive incoming data 171 from one or more sources, in which the incoming data 171 is destined for a line associated with the client 103. The data application 161 may analyze the incoming data 171 to determine whether the incoming data 171 is to be labeled as secure data, and this determination may be performed based on content type included in the incoming secure services and/or content, SIP or HTTP headers/tags, originating identities, etc. The data application 161 may also add security parameter(s) 155 to the incoming data 171 based on various factors, such as, for example, a source of the incoming data 171, a path of the incoming data 171 to the data server 115, a content in the incoming data 171, etc.

At step 232, the data application 161 may send a notification 233 of pending incoming data 171 destined for the line associated with the user of the client 103, and stored at the data store 164. The notification 233 may only indicate pending incoming data 171 that the client 103 is permitted to receive. For example, when the client 103 is not permitted to receive incoming data 171 having a first security parameter 155, the notification 233 may not indicate the incoming data 171 having the first security parameter 155, even though the data store 164 may store incoming data 171 having the first security parameter 155 that is destined for the line.

It should be appreciated the steps in message sequence diagram 200 do not include all of the steps involved in the authentication and subscription process. Instead, the steps included in the message sequence diagram 200 are for illustrative purposes only, and should not be limited herein. Moreover, the sequence of the steps in the message sequence diagram 200 may be performed in any order, and should not be limited to the sequence shown in the message sequence diagram 200. In some cases, certain steps may not even be performed during the authentication and subscription process of the message sequence diagram 200.

Turning now to FIG. 2B, shown is a message sequence diagram 235 illustrating a second method for securely delivering incoming data 171 to non-SIM-based clients 103. Specifically, the message sequence diagram 235 of FIG. 2B illustrates the fetching of incoming data 171 from the data server 115 for the client 103 based on the security parameter 155 of each incoming data 171.

Regardless of whether the client 103 received the notification 233 of pending incoming data 171, at step 238, the client 103 may generate and transmit a sync request 241 to the core application 142 (or in some cases, directly to the data application 161). The sync request 241 may include the access token 131 assigned to the client 103 during the authentication process described in FIG. 2A. First, at step 243, the core application 142 (or the data application 161) may validate the access token 131 received from the client 103. Step 243 may be similar to step 221 of the message sequence diagram 200 of FIG. 2A. At step 246, the core application 142 (or the data application 161) may obtain the authentication type 133 from the access token 131 received from the client 103. At this point, the core application 142 and/or the data application 161 may perform different steps based on the authentication type 133 indicated in the access token 131 and the policies 180 governing permissions and restrictions associated with the authentication type 133.

In a first embodiment, the authentication type 133 indicated in the access token 131 may meet a threshold authentication level 247 (e.g., strong or high-level authentication type 133). In this embodiment, the core application 142 may determine, for example, based on a policy 180, whether the authentication type 133 of the client 103 meets a threshold authentication level 247. The meeting of the threshold authentication level 247 may be a condition that may need to be met for the client 103 to receive certain types of incoming data 171 from the data store 164 (e.g., secure messages 255, which are an example of incoming data 171 with a first security parameter 155 (e.g., a high security parameter)).

For example, a policy 180 may indicate the different authentication types 133 that a client 103 may use to authenticate with the authorization server 112, and whether each authentication type 133 meets a threshold authentication level 247. If so, the core application 142 may add a field to the sync request 241 indicating that the authentication type 133 in the access token 131 meets the threshold authentication level 247. For example, the field may include "securedContent=TRUE," which may signal to the data application 161 that the client 103 is permitted to receive secure messages 255. At step 248, the core application 142 may forward the sync request 241 to the data server 115.

At step 258, the data application 161 may forward the incoming data 171 (e.g., the secure messages 255 with a first security parameter 155, and all other pending or requested incoming data 171) destined for the line and stored at the data store 164. In one case, the data application 161 may forward these incoming data 171 to the core application 142, and the core application 142 may forward the incoming data 171 to the client 103 at step 259. In another case, the data application 161 may send these incoming data 171 directly to the client 103.

In a second embodiment, the authentication type 133 indicated in the access token 131 may not meet a threshold authentication level 247, but instead may have a lesser authentication level (e.g., weak, medium, or low authentication level). In this embodiment, the core application 142 may determine, for example, based on a policy 180, that the authentication type 133 of the client 103 does not meet the threshold authentication level 247 to receive certain types of incoming data 171 from the data store 164 (e.g., secure messages 255). If so, the core application 142 may add a field to the sync request 241 indicating that the authentication type 133 in the access token 131 does not meet the threshold authentication level 247. For example, the field may include "securedContent=FALSE," which may signal to the data application 161 that the client 103 is only permitted to receive standard messages 257, which are types of incoming data 171 that do not have the first security parameter 155 (e.g., high security parameter 155), or incoming data 171 that have a second security parameter 155 (e.g., low security parameter 155). At step 264, the core application 142 may forward the sync request 241 to the data server 115.

At step 267, the data application 161 may forward the incoming data 171 (e.g., only the pending or requested standard messages 257) destined for the line and stored at the data store 164. In one case, the data application 161 may forward these incoming data 171 to the core application 142, and the core application 142 may forward the incoming data 171 to the client, at step 269. In another case, the data application 161 may send the incoming data 171 directly to the client 103 at step 267.

At step 271, when the client 103 is only permitted to receive standard types of incoming data 171 (e.g., standard messages 257), the data application 161 may transmit a security message 273 to the client 103. The security message 273 may indicate that the client 103 has not met a minimum authentication requirement with the authorization server 112 to retrieve secure types of incoming data 171 (e.g., secure messages 255) from the data store 164. The security message 273 may include text indicating the authentication requirement(s) for retrieving secure types of incoming data 171 from the data store 164. For example, the security message 273 may indicate that a specific second factor 124 may be required for the client 103 to receive secure types of incoming data 171.

It should be appreciated the steps in message sequence diagram 235 do not include all of the steps involved in the method for securely delivering incoming data 171 to non-SIM-based clients 103. Instead, the steps included in the message sequence diagram 235 are for illustrative purposes only, and should not be limited herein. Moreover, the sequence of the steps in the message sequence diagram 235 may be performed in any order, and should not be limited to the sequence shown in the message sequence diagram 235. In some cases, certain steps may not even be performed during the method illustrated in the message sequence diagram 235.

Turning now to FIG. 2C, shown is a message sequence diagram 275 illustrating a third method for securely delivering incoming data 171 to non-SIM-based clients 103. Specifically, the message sequence diagram 275 of FIG. 2C illustrates the caching of incoming data 171 at the data store 164.

The IMS core network 109 may receive incoming data 171 destined for a line associated with the user. The line may always be associated with the user device 104 based for example on a subscription plan of the user device 104 with the IMS core network 109. However, the line may only be associated with the non-SIM-based client 103 after the client 103 authenticates with the authorization server 112, as described herein.

The IMS core network 109 may receive incoming data 171 destined for the line, which may again be replicated at the client 103 and the user device 104. The IMS core network 109 (e.g., services and NEs in the IMS core network 109) may automatically forward the incoming data 171 to the user device 104. However, when the client 103 requests the service for enabling use of the line at the client 103 and authenticates with the authorization server 112, the IMS core network 109 may also send the incoming data 171 to the data server 115 (for temporary caching at the data store 164).

At step 278, the data application 161 may receive incoming data 171 from the IMS core network 109 (which may be received by the user device 104 in parallel). At step 279, the data application may determine whether the incoming data 171 is to be labeled as secure data, and this determination may be performed based on content type included in the incoming secure services and/or content, SIP or HTTP headers/tags, originating identities, etc. At step 281, the data application 161 may determine a security parameter 155 for each data item in the incoming data 171. The security parameter 155 may be determined based on various factors, such as, for example, a source of the incoming data 171, a path of the incoming data 171 to the data server 115, a content in the incoming data 171, etc. For example, the data application 161 may determine that the security parameter 155 for incoming data 171 is a first value (e.g., a value corresponding to a high-level of security based on the incoming data 171 including highly secure, sensitive information). This determination that the security parameter 155 for message (e.g., incoming data 171) is a first value may be made in response to a determination that the message originating from an application (e.g., source), such that the message is an application-to-peer (A2P) message. As another example, the data application 161 may determine that the security parameter 155 for an incoming call (e.g., incoming data 171) is the first value when the incoming call flows through a path including a service delivery gateway. The data application 161 may determine that the security parameter 155 for a multimedia file (e.g., incoming data 171) is a second value (e.g., a value corresponding to a low-level of security) when the multimedia file flows through a path including an SMS gateway. As yet another example, the data application 161 may determine that the security parameter 155 for a message (e.g., incoming data 171) is a first value when the content of the message includes a one-time code. The data application 161 may determine that the security parameter for a message (e.g., incoming data 171) is a second value when the content of the message includes casual text (e.g., may be determined using natural language processing (NLP) methods).

In the aforementioned examples, the security parameters 155 correspond to high and/or low levels, and in this way, the security parameter 155 may be a certain value corresponding to high and/or low (e.g., high may be the value 1 while low may be the value 0, or vice versa). In other cases, the security parameters 155 may be more than just a binary, high/low value. For example, the security parameters 155 may be values within a certain range (e.g., 1-5, in which 1 is a value corresponding to a message that does not contain any secure, private information, and 5 is a value corresponding to incoming data 171 that contains more than a threshold amount of secure, private information). In this way, the security parameter 155 of incoming data 171 may be a value describing a security level or privacy level of information contained in the incoming data 171. At step 284, the data application 161 may store the incoming data 171 in the data store 164 (temporarily for a period of time or at least until the incoming data 171 is fetched by the client 103 and then transmitted to the client 103).

Subsequent to step 284, the message sequence diagram 275 may proceed similar to the steps of the message sequence diagram 235 of FIG. 2B. Step 288 of message sequence diagram 275 may be similar to step 238 of the message sequence diagram 235 of FIG. 2B, except that in message sequence diagram 275, client 103 transmits a sync request 241 with the access token 131 to the data application 161 (as opposed to the core application 142). In this embodiment, the data application 161 may perform steps 243 and 246 of message sequence diagram 235 to validate the access token 131 and obtain the authentication type 133 of the access token 131. Further, in this embodiment, the data application 161 may perform the steps of determining whether authentication type 133 in the access token 131 meets the threshold authentication level 247 or not based on, for example, the policies 180 (as opposed to receiving this information (e.g., "securedContent=TRUE/FALSE") from the core application 142). The data application 161 may then determine the incoming data 171 (e.g., the secure messages 255 and/or standard messages 257) that are permitted to be sent to the client 103 based on the access token 131 received from the client 103, and then transmit the permitted incoming data 171 directly to the client 103 (bypassing the core application 142).

Figure 3:
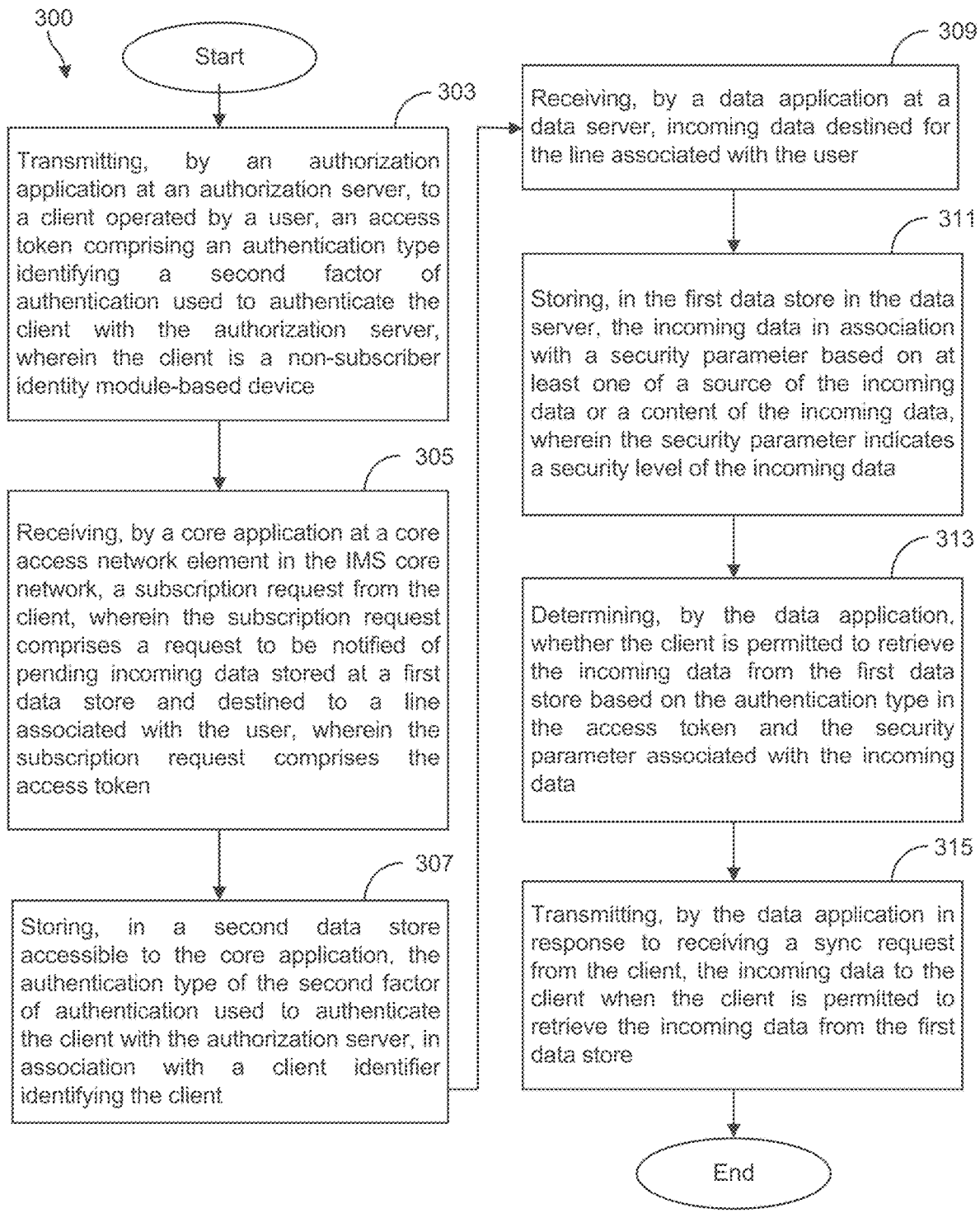
FIG. 3 is a flowchart of a first method of secure incoming data delivery according to various embodiments of the disclosure.

Referring now to FIG. 3, shown is flowchart illustrating a method 300 for securely delivering incoming content to non-SIM-based clients 103 according to various embodiments of the disclosure. The method 300 may be performed by the authorization application 158, the core application 142, and/or the data application 161. In an embodiment, method 300 may be performed after a user device 103 has subscribed with the TSP operating the IMS core network 109, but before the client 109 has authenticated with the authorization server 112. In an embodiment, the client 103 may be a non-SIM-based device that is not tied to a line associated with the user.

At step 303, method 300 may comprise transmitting, by an authorization application 158 at an authorization server 112, to a client 103 operated by a user, an access token 131 comprising an authentication type 133 identifying a second factor 124 of authentication used to authenticate the client 103 with the authorization server 112. In an embodiment, the client 103 may be a non-SIM-based device that is not tied to a line associated with the user.

At step 305, method 300 may comprise receiving, by a core application 142 at a core access NE 139 in the IMS core network 109, a subscription request 218 from the client 103. The subscription request 218 comprises a request to be notified of pending incoming data 171 stored at a data store 164 and destined to a line associated with the user, in which the subscription request 218 comprises the access token 131. At step 307, method 300 may comprise storing, in a data store 118 accessible to the core application 142, the authentication type 133 of the second factor 124 of authentication used to authenticate the client 103 with the authorization server 112, in association with a client identifier 136 identifying the client 103. At step 309, method 300 comprises receiving, by a data application 161 at a data server 115, incoming data 171 destined for the line associated with the user.

At step 311, method 300 may comprise storing, in a data store 164 in the data server 115, the incoming data 171 in association with a security parameter 155 based on at least one of a source of the incoming data 171 or a content of the incoming data 171. The security parameter 155 indicates a security level of the incoming data 171. At step 313, method 300 may comprise determining, by the data application 161, whether the client 103 is permitted to retrieve the incoming data 171 from the data store 164 based on the authentication type 133 in the access token 131 and the security parameter 155 associated with the incoming data 171. At step 315, method 300 may comprise transmitting, by the data application 161 in response to receiving a sync request 241 from the client 103, the incoming data 171 to the client 103 when the client 103 is permitted to retrieve the incoming data 171 from the data store 164.

Method 300 may include other steps and/or features that are not otherwise shown in FIG. 3. In an embodiment, method 300 may further comprise receiving, by the authorization application 158, security credentials 122 from the client 103, wherein the security credentials 122 are associated with a user account of the user, and receiving, by the authorization application 158, a second factor 124 of authentication from the client 103. In an embodiment, method 300 may further comprise authenticating, by the authorization application 158, the client 103 based on security credentials 122 and the second factor 124 of authentication received from the client 103. In an embodiment, method 300 may further comprise transmitting, by the data application 161, to the client 103, a notification 233 indicating that the data store 164 includes the incoming data 171 destined for the line associated with the user when a policy 180 indicates that the authentication type 133 stored in association with the client identifier 136 meets a condition associated with transmitting the incoming data 171 to the client 103. In an embodiment, method 300 may further comprise receiving, by the data application 161, from the client 103, the sync request 241 to receive the incoming data 171 from the data store 164, wherein the sync request 241 comprises the access token 131.

In an embodiment, the second factor 124 of authentication comprises at least one of a one-time code received at a user device 104 separate from the client 103 via a short message service (SMS), a time-based one-time code received at the user device 104 via the SMS, an authentication application generating the one-time code, a biometric authentication, a hardware token, a smart card, a push notification, or a location-based authentication, and wherein the authentication type 133 of the second factor 124 of authentication is a value indicating a strong authentication type. In an embodiment, the second factor 124 of authentication comprises at least one of a one-time code received by the user via email or a security question and answer, and wherein the authentication type 133 of the second factor 124 of authentication is a value indicating a weak authentication type. In an embodiment, the security parameter 155 indicates a value identifying at least one of a secure message 255 or a standard message 257. In an embodiment, when the source of the incoming data 171 is a short message service (SMS) gateway, the security parameter 155 comprises a value identifying standard data (e.g., a standard message 257), and wherein when the source of the incoming data 171 is an application service delivery gateway, the security parameter 155 comprises a value identifying secure data (e.g., a secure message 255).

Figure 4:
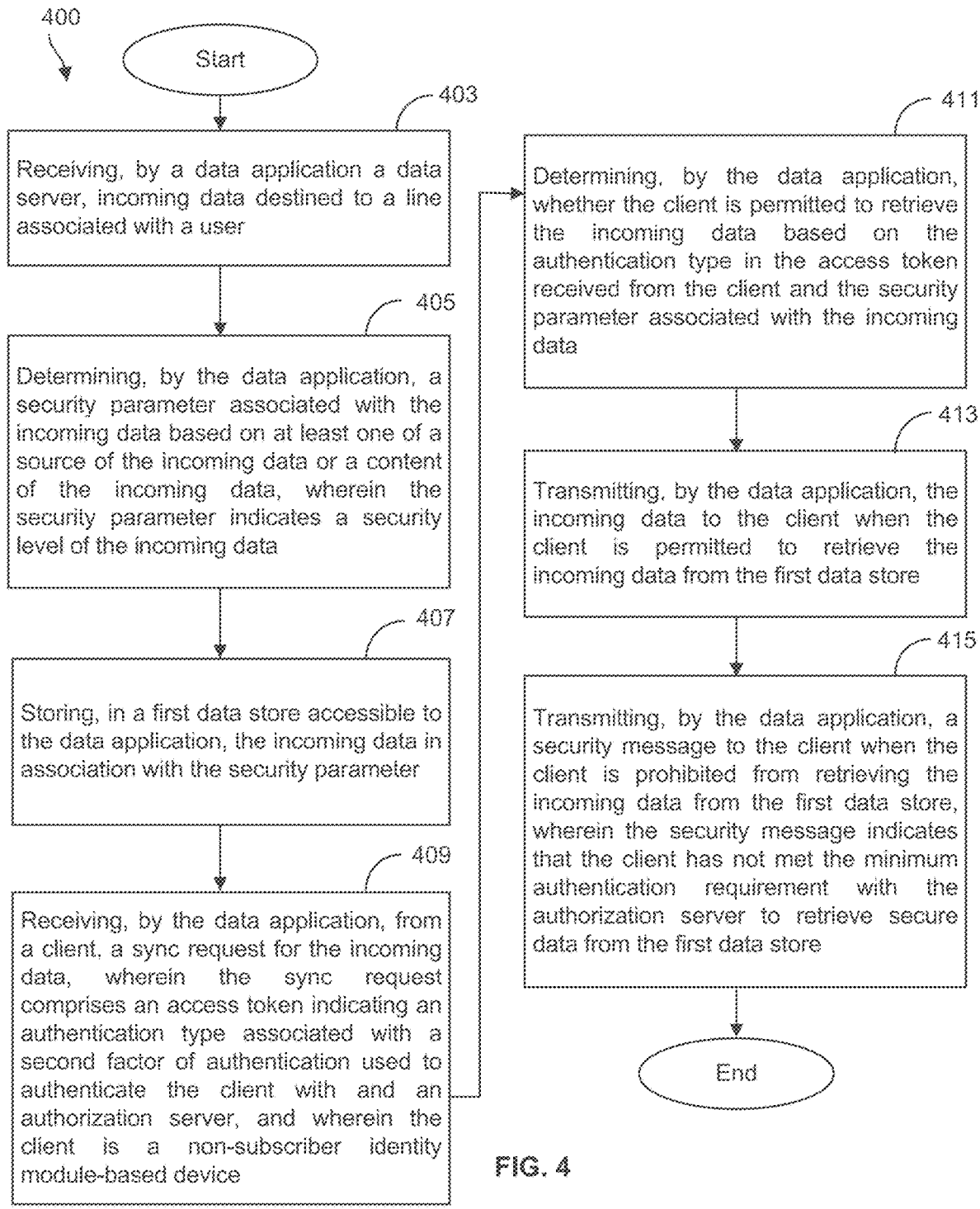
FIG. 4 is a flowchart of a second method of secure incoming data delivery according to various embodiments of the disclosure.

Referring now to FIG. 4, shown is flowchart illustrating a method 400 for securely delivering incoming content to non-SIM-based clients 103 according to various embodiments of the disclosure. The method 400 may be performed by the authorization application 158, the core application 142, and/or the data application 161. In an embodiment, method 400 may be performed after a user device 103 has subscribed with the TSP operating the IMS core network 109, but before the client 109 has authenticated with the authorization server 112. In an embodiment, the client 103 may be a non-SIM-based device that is not tied to a line associated with the user.

At step 403, method 400 may comprise receiving, by a data application 161 a data server 115, incoming data 171 destined to a line associated with a user. At step 405, method 400 may comprise determining, by the data application 161, a security parameter 155 associated with the incoming data 171 based on at least one of a source of the incoming data 171 or a content of the incoming data 171, wherein the security parameter 155 indicates a security level of the incoming data 171. At step 407, method 400 may comprise storing, in a data store 164 in the data server 115, the incoming data 171 in association with the security parameter 155. At step 409, method 400 may comprise receiving, by the data application 161, from a client 103, a sync request 241 for the incoming data 171. The sync request 241 comprises an access token 131 indicating an authentication type 133 associated with a second factor 124 of authentication used to authenticate the client 103 with an authorization server 112. The client 103 is a non-SIM-based device.

At step 411, method 400 may comprise determining, by the data application 161, whether the client 103 is permitted to retrieve the incoming data 171 based on the authentication type 133 in the access token 131 received from the client 103 and the security parameter 155 associated with the incoming data 171. At step 413, method 400 may comprise transmitting, by the data application 161, the incoming data 171 to the client 103 when the client 103 is permitted to retrieve the incoming data 171 from the data store 164. At step 415, method 400 may comprise transmitting, by the data application 161, a security message to the client 103 when the client 103 is prohibited from retrieving the incoming data 171 from the data store 164. The security message indicates that the client 103 has not met the minimum authentication requirement with the authorization server 112 to retrieve secure messages 255 from the data store 164.

Method 400 may include other steps and/or features that are not otherwise shown in FIG. 4. In an embodiment, method 400 may further comprise transmitting, by the data application 161, to the client 103, a notification 233 indicating that the data store 164 includes the incoming data 171 destined to the line associated with the user when the authentication type 133 stored in association with the client identifier 136 indicates a first authentication type 133. In an embodiment, the security parameter 155 comprises a value indicating the security level of the incoming data 171. In an embodiment, wherein the authentication type 133 comprises a value indicating the second factor 124 of authentication used to authenticate the client 103 with an authorization server 112. In an embodiment, the security parameter 155 indicates a value identifying at least one of secure data (e.g., a secure message 255) or standard data (e.g., a standard message 257). In an embodiment, when the source of the incoming data 171 is a short message service (SMS) gateway, the security parameter 155 comprises a value identifying a standard message 257, and wherein when the source of the incoming data 171 is an application service delivery gateway, the security parameter 155 comprises a value identifying a secure message 255.

Figure 5:
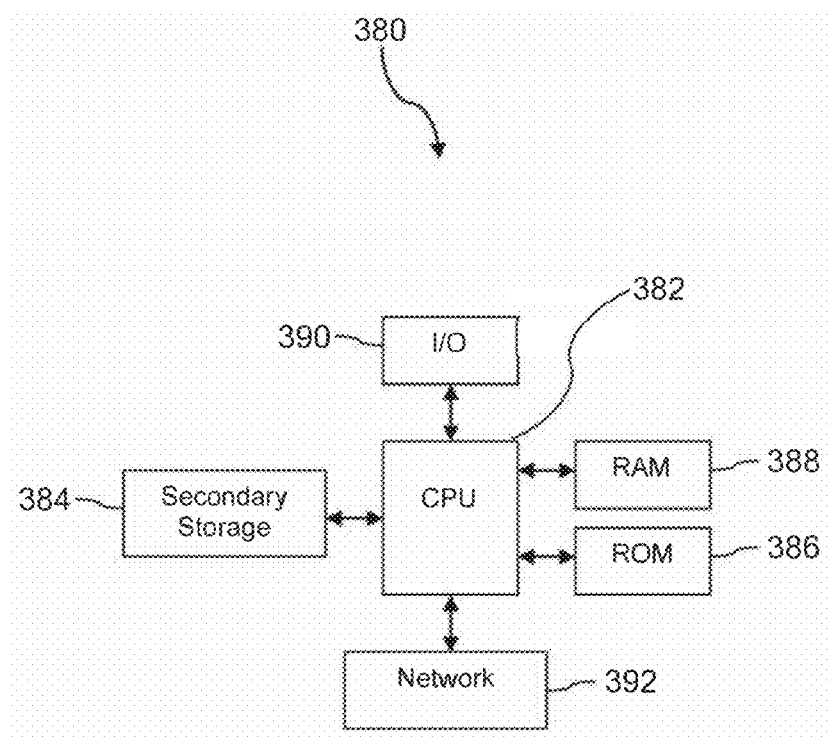
FIG. 5 is a block diagram of a computer system implemented within the communication system of FIG. 1 according to an embodiment of the disclosure.

FIG. 5 illustrates a computer system 380 suitable for implementing one or more embodiments disclosed herein. In an embodiment, the clients 103 and 106, the authorization server 112, the data server 115, and the core access NE 135 may each be implemented as the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers.

In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method implemented in a communication network including an Internet Protocol (IP) Media Subsystem (IMS) core network, wherein the method comprises:
   transmitting, by an authorization application at an authorization server, to a client operated by a user, an access token comprising an authentication type identifying a second factor of authentication used to authenticate the client with the authorization server, wherein the client is a non-subscriber identity module-based device;
   receiving, by a core application at a core access network element in the IMS core network, a subscription request from the client, wherein the subscription request comprises a request to be notified of pending incoming data stored at a first data store and destined to a line associated with the user, wherein the subscription request comprises the access token;
   storing, in a second data store accessible to the core application, the authentication type of the second factor of authentication used to authenticate the client with the authorization server, in association with a client identifier identifying the client;
   receiving, by a data application at a data server, incoming data destined for the line associated with the user;
   storing, in the first data store in the data server, the incoming data in association with a security parameter based on at least one of a source of the incoming data or a content of the incoming data, wherein the security parameter indicates a security level of the incoming data;
   determining, by the data application, whether the client is permitted to retrieve the incoming data from the first data store based on the authentication type in the access token and the security parameter associated with the incoming data; and
   transmitting, by the data application in response to receiving a sync request from the client, the incoming data to the client when the client is permitted to retrieve the incoming data from the first data store.

2. The method of claim 1, further comprising:
   receiving, by the authorization application, security credentials from the client, wherein the security credentials are associated with a user account of the user; and
   receiving, by the authorization application, a second factor of authentication from the client.

3. The method of claim 2, further comprising authenticating, by the authorization application, the client based on security credentials and the second factor of authentication received from the client.

4. The method of claim 1, further comprising transmitting, by the data application, to the client, a notification indicating that the first data store includes the incoming data destined for the line associated with the user when a policy indicates that the authentication type stored in association with the client identifier meets a condition associated with transmitting the incoming data to the client.

5. The method of claim 1, further comprising receiving, by the data application, from the client, the sync request to receive the incoming data from the first data store, wherein the sync request comprises the access token.

6. The method of claim 1, wherein the second factor of authentication comprises at least one of a one-time code received at a user device separate from the client via a short message service (SMS), a time-based one-time code received at the user device via the SMS, an authentication application generating the one-time code, a biometric authentication, a hardware token, a smart card, a push notification, or a location-based authentication, and wherein the authentication type of the second factor of authentication is a value indicating a strong authentication type.

7. The method of claim 1, wherein the second factor of authentication comprises at least one of a one-time code received by the user via email or a security question and answer, and wherein the authentication type of the second factor of authentication is a value indicating a weak authentication type.

8. The method of claim 1, wherein the security parameter indicates a value identifying at least one of a secure message or a standard message.

9. The method of claim 8, wherein when the source of the incoming data is a short message service (SMS) gateway, the security parameter comprises a value identifying standard data, and wherein when the source of the incoming data is an application service delivery gateway, the security parameter comprises a value identifying secure data.

10. A method implemented in a communication network including an Internet Protocol (IP) Media Subsystem (IMS) core network, wherein the method comprises:
   receiving, by a data application a data server, incoming data destined to a line associated with a user;
   determining, by the data application, a security parameter associated with the incoming data based on at least one of a source of the incoming data or a content of the incoming data, wherein the security parameter indicates a security level of the incoming data;
   storing, in a first data store accessible to the data application, the incoming data in association with the security parameter;
   receiving, by the data application, from a client, a sync request for the incoming data, wherein the sync request comprises an access token indicating an authentication type associated with a second factor of authentication used to authenticate the client with an authorization server, and wherein the client is a non-subscriber identity module-based device, determining, by the data application, whether the client is permitted to retrieve the incoming data based on the authentication type in the access token received from the client and the security parameter associated with the incoming data;

transmitting, by the data application, the incoming data to the client when the client is permitted to retrieve the incoming data from the first data store; and transmitting, by the data application, a security message to the client when the client is prohibited from retrieving the incoming data from the first data store, wherein the security message indicates that the client has not met a minimum authentication requirement with the authorization server to retrieve secure data from the first data store.

11. The method of claim 10, further comprising transmitting, by the data application, to the client, a notification indicating that the first data store includes the incoming data destined to the line associated with the user when the authentication type stored in association with a client identifier indicates a first authentication type.

12. The method of claim 10, wherein the security parameter comprises a value indicating the security level of the incoming data.

13. The method of claim 10, wherein the authentication type comprises a value indicating the second factor of authentication used to authenticate the client with an authorization server.

14. The method of claim 12, wherein the security parameter indicates a value identifying at least one of a secure message or a standard message.

15. The method of claim 9, wherein when the source of the incoming data is a short message service (SMS) gateway, the security parameter comprises a value identifying standard data, and wherein when the source of the incoming data is an application service delivery gateway, the security parameter comprises a value identifying secure data.

16. A data server, comprising:
a non-transitory memory;
a processor coupled to the non-transitory memory; and
a data application stored at the non-transitory memory, which when executed by the processor, causes the processor to be configured to:
receive incoming data destined to a line associated with a user;
determine a security parameter associated with the incoming data based on at least one of a source of the incoming data or a content of the incoming data, wherein the security parameter indicates a security level of the incoming data;
store, in a first data store accessible to the data application, the incoming data in association with the security parameter;
receive from a client, a sync request for the incoming data, wherein the sync request comprises an access token indicating an authentication type associated with a second factor of authentication used to authenticate the client with an authorization server, and wherein the client is a non-subscriber identity module-based device,
determine whether the client is permitted to retrieve the incoming data based on the authentication type in the access token received from the client and the security parameter associated with the incoming data;
transmit the incoming data to the client when the client is permitted to retrieve the incoming data from the first data store; and
transmit a security message to the client when the client is prohibited from retrieving the incoming data from the first data store, wherein the security message indicates that the client has not met a minimum authentication requirement with the authorization server to retrieve secure data from the first data store.

17. The data server of claim 16, wherein the data application further causes the data application to transmit, to the client, a notification indicating that the first data store includes the incoming data destined to the line associated with the user when the authentication type stored in association with a client identifier indicates a first authentication type.

18. The data server of claim 16, wherein the security parameter comprises a value indicating the security level of the incoming data.

19. The data server of claim 16, wherein the authentication type comprises a value indicating the second factor of authentication used to authenticate the client with the authorization server.

20. The data server of claim 16, wherein the security parameter indicates at least one of a secure message or a standard message.

* * * * *